United States Patent
Machiguchi et al.

(10) Patent No.: US 6,821,691 B2
(45) Date of Patent: Nov. 23, 2004

(54) COLOR FILTER ARRAY HAVING A RED FILTER LAYER

(75) Inventors: Kazuhiro Machiguchi, Toyonaka (JP); Yuuji Ueda, Izumiotsu (JP); Hiroki Endo, Tokyo (JP); Taichi Natori, Tokyo (JP); Toyomi Jinwaki, Kokubu (JP)

(73) Assignees: Sumitomo Chemical Company, Limited, Osaka (JP); Sony Corporation, Tokyo (JP)

( * ) Notice: Subject to any disclaimer, the term of this patent is extended or adjusted under 35 U.S.C. 154(b) by 0 days.

(21) Appl. No.: 10/798,379

(22) Filed: Mar. 12, 2004

(65) Prior Publication Data

US 2004/0170908 A1 Sep. 2, 2004

Related U.S. Application Data (62) Division of application No. 09/893,569, filed on Jun. 29, 2001, now Pat. No. 6,733,934.

(30) Foreign Application Priority Data

Jun. 30, 2000 (JP) .................................. 2000-198912

(51) Int. Cl.$^7$ ................................................ G02B 5/20
(52) U.S. Cl. ............................................................. 430/7
(58) Field of Search ............................................... 430/7

(56) References Cited

U.S. PATENT DOCUMENTS

| | | | |
|---|---|---|---|
| 4,808,501 A | | 2/1989 | Chiulli |
| 4,963,463 A | | 10/1990 | Koshiba et al. |
| 5,541,750 A | * | 7/1996 | Seong et al. ................. 349/106 |
| 5,876,895 A | | 3/1999 | Hishiro et al. |
| 5,897,981 A | * | 4/1999 | Kobayashi et al. ............. 430/7 |
| 6,203,604 B1 | * | 3/2001 | Kashiwazaki et al. ..... 106/31.5 |
| 6,203,951 B1 | | 3/2001 | Furukawa et al. |

FOREIGN PATENT DOCUMENTS

| | | |
|---|---|---|
| EP | 0947563 A1 | 10/1999 |
| JP | 635182 A | 2/1994 |
| JP | 6-294909 | 10/1994 |
| JP | 9118836 | 5/1997 |
| JP | 10-288708 | 10/1998 |
| JP | 2000122278 | 4/2000 |

* cited by examiner

*Primary Examiner*—John A. McPherson
(74) *Attorney, Agent, or Firm*—Birch, Stewart, Kolasch & Birch, LLP (57) ABSTRACT

A color filter array having a red filter layer on a substrate wherein the red filter layer comprises a xanthene % dye having its absorption maximum at a wavelength of 500 to 600 nm, and a pirazolone azo dye having its absorption maximum at a wavelength of 400 to 550 nm; and has a transmittance at a wavelength of 535 nm of 1% or less and that at 650 nm of 90% or more; and the color filter array shows excellent spectroscopic characteristics with respect to red light and has a red filter layer excellent in light fastness.

3 Claims, 4 Drawing Sheets

COLOR FILTER ARRAY HAVING A RED FILTER LAYER

This application is Divisional of application Ser. No. 09/893,569, filed on Jun. 29, 2001, now U.S. Pat. No. 6,733,934, the entire contents of which are hereby incorporated by reference and for which priority is claimed under 35 U.S.C. § 120; and this application claims priority of Application No. 2000-198912 filed in Japan on Jun. 30, 2000 under 35 U.S.C. § 119.

BACKGROUND OF THE INVENTION

The present invention relates to color filter arrays for solid-state image devices or liquid crystal display devices, and to a method for producing the same.

Figure 1:
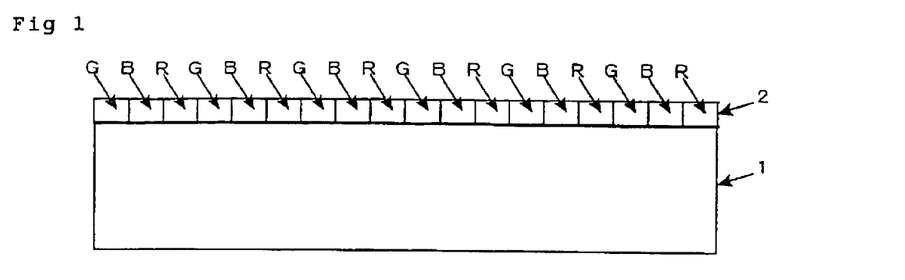
FIG. 1 is a schematic view showing a cross-section of a color filter array in which a green filter layer, a red filter layer, and a blue filter layer are provided in the same plane of a substrate.
Figure 2:
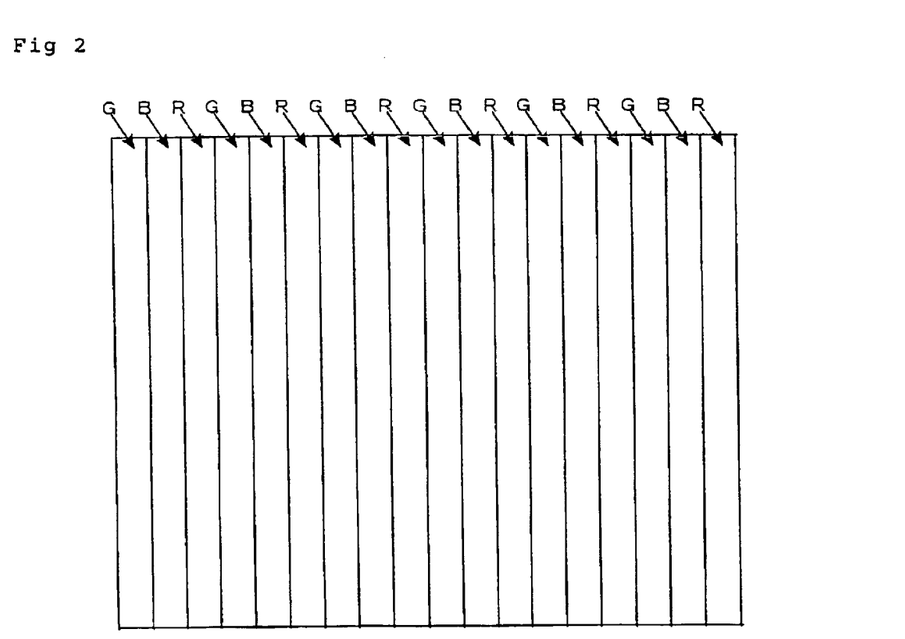
FIG. 2 is a plane schematic view of a color filter array provided with a green filter layer, a red filter layer, and a blue filter layer arranged in a striped pattern.
Figure 3:
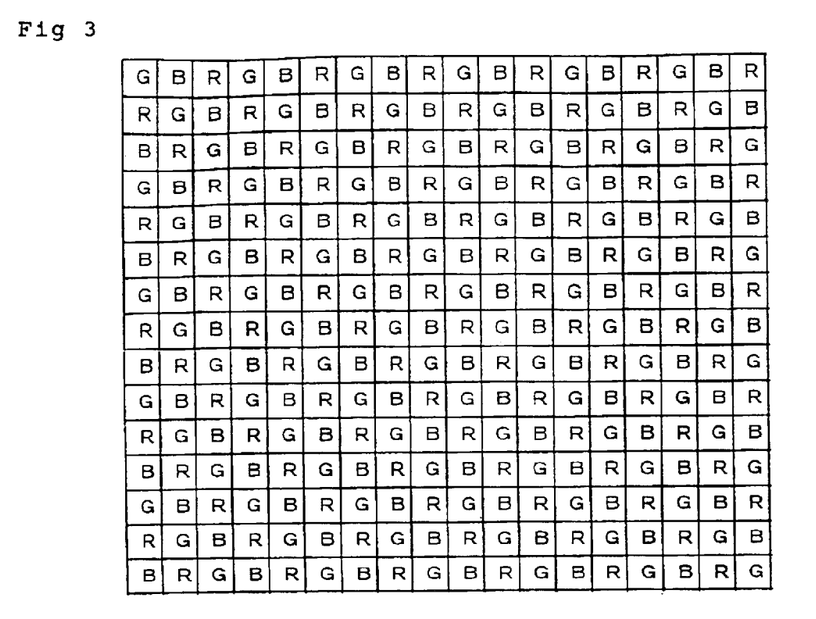
FIG. 3 is a plane schematic view of a color filter array provided with a green filter layer a red filter layer, and a blue filter layer arranged in a mosaic pattern.

As a color filter array formed on a device such as a solid-state image device or a liquid crystal display device, there has been known a color filter array (2) constituted of a red filter layer (R), a green filter layer (G), and a blue filter layer (B) formed so as to be adjoining to each other in the same plane of a substrate (1) (FIG. 1). In the color filter array (2), the filter layers (R), (G), (B) are arranged in a striped pattern (FIG. 2) or a lattice-like pattern (mosaic) (FIG. 3).

A variety of processes for producing such color filter array have been proposed. Among them, so-called "color resist method" is in wide practical use. In the color resist method, the patterning is effected by exposing a photosensitive resin composition comprising colorants to light and developing, and the patterning is repeated in sequence in the required times.

As the photosensitive resin composition which is employed in the color resist method, those employing pigments as colorants are in wide use. However, such pigments are not suitable for the formation of fine or minute patterns, for they are granular and do not dissolve in developers, and developing residue is generated.

As a photosensitive resin composition for obtaining a finely patterned color filter array, a photosensitive resin composition employing dyes as colorants has also been known. For example, Japanese Patent Application Laid-Open No. 6-75375 discloses a negative photosensitive resin composition comprising dyes, and Japanese Patent Publication No. 7-111485 discloses a positive photosensitive resin composition comprising 10 to 50%, on a dry weight basis, of a dye soluble in the solvent used in the positive photosensitive resin composition. (Hereinafter, "JP-A-" is used for indicating Japanese Patent Application Laid-Open, and "JP-B-" is used for indicating Japanese Patent Publication.) Colorants comprised in photosensitive resin compositions used for producing color filter arrays, such as those described above, are required to have the following two properties.

(1) Good spectroscopic characteristics, that is, showing sufficient absorption within the predetermined visible ray region and no unnecessary absorption in the other region.

(2) Good light fastness, that is, no burn-in due to the decolorization of dyes under normal operating conditions However, none of the dyes employed in conventional photosensitive resin compositions has both of the above-described two properties.

For example, although the red filter layer of a color filter is desired to have a small transmittance at a wavelength of 450 nm and at a wavelength of 535 nm, and large transmittance at a wavelength of 650 nm, in the conventional photosensitive resin compositions, attempts to lower the transmittance at 535 nm cause a decrease in transmittance at 650 nm, deteriorating the spectroscopic characteristics.

Such problems of conventional photosensitive resin compositions will be mentioned below more concretely.

A photosensitive resin composition comprising a pirazolone azo dye (C. I. Solvent Red 8) is described in above-mentioned JP-B-7-111485. The dye is excellent in light fastness. However, attempt for making the transmittance of the resulting red filter layer at 650 nm larger tends to cause the transmittance at 450 nm larger. As a result, color filters having a red filter layer formed by using such photosensitive resin composition were not always satisfactory in their performance. As a matter of fact, according to the gazette, the transmittance of a 2 μm-thick red filter layer formed by using such photosensitive resin composition is 5% at 450 nm, 0.6% at 535 nm, and 85% at 650 nm.

A colorant having good spectroscopic characteristics is known. However, none of colorants having good spectroscopic characteristics is satisfactory in light fastness. Therefore, it has been difficult to manufacture a color filter array having a practical red filter layer.

The inventors of the present invention have made intensive and extensive studies to develop a color filter array having a red filter layer having good spectroscopic characteristics as well as good light fastness. As a result, they have found that the use of at least two types of specific dyes realizes the formation of a red filter layer satisfactory both in spectroscopic properties and light fastness. The present invention was accomplished based on this finding.

SUMMARY OF THE INVENTION

The present invention provides a color filter array having a red filter layer on a substrate wherein the red filter layer comprises a xanthene dye (hereinafter, referred to as dye (I)) having its absorption maximum at a wavelength of 500 to 600 nm, and a pirazoloneazo dye (hereinafter referred to as dye (II)) having its absorption maximum at a wavelength of 400 to 550 nm; and has a transmittance at a wavelength of 535 nm of 1% or less and that at 650 nm of 90% or more.

The present invention also provides a process for producing the color filter array.

BRIEF DESCRIPTION OF THE DRAWINGS

[FIG. 1]

[FIG. 2]

[FIG. 3]

[FIG. 4]

[FIG. 5]

[FIG. 6]

DESCRIPTION OF REFERENCE NUMERALS

1: substrate
2: color filter array
3: over coating film
4: polysilicon electrode
5: sensor
6: V resistor
7: light-shielding film
8: passivation film
9: microlens
R: red filter layer
G: green filter layer
B: blue filter layer

EMBODIMENT OF THE INVENTION

As the substrate used in the color filter of the present invention, a silicon wafer and a transparent inorganic glass plate are exemplified. On the silicone wafer, a charge coupled device may be formed.

The color filter array of the present invention has a red filter layer on its substrate.

The red filter layer comprises a dye (I) having its absorption maximum at a wavelength of 500 to 600 nm, and a dye (II) having its absorption maximum at a wavelength of 400 to 550 nm.

Exemplified as the dye-(I) are compounds represented by the general formula (1):

(I)

wherein $R^{10}$, $R^{11}$, $R^{12}$ and $R^{13}$ each independently represents hydrogen atom or an alkyl group having 1 to 3 carbon atoms; and $R^{14}$, $R^{15}$, and $R^{16}$ each independently represents a sulfonic acid group or a group represented by the general formula $$R^{17}HNSO_2 \tag{1}$$

wherein $R^{17}$ represents an alkyl group having 2 to 20 carbon atoms, a cyclohexylalkyl group wherein the alkyl chain has 2 to 12 carbon atoms, an alkylcyclohexyl group wherein the alkyl chain has 1 to 4 carbon atoms, an alkyl group which has 2 to 12 carbon atoms and has been substituted with an alkoxyl group having 2 to 12 carbon, an alkylcarboxylalkyl group represented by the general formula (1-1):

$$R^{180}—CO—O—R^{181} \tag{1-1}$$

wherein $R^{180}$ represents an alkyl group having 2 to 12 carbon atoms, and $R^{181}$ represents an alkylene group having 2 to 12 carbon atoms, an alkyloxycarbonylalkyl group represented by the general formula (1-2):

$$R^{190}—O—CO—R^{191} \tag{1-2}$$

wherein $R^{190}$ represents an alkyl group having 2 to 12 carbon atoms, and $R^{191}$ represents an alkylene group having 2 to 12 carbon atoms a phenyl group substituted with an alkyl group having 1 to 20 carbon atoms, or an alkyl group which has 1 to 20 carbon atoms and has been substituted with phenyl group;

and salts thereof.

Examples of the alkyl group having 1 to 3 carbon atoms represented by $R^{30}$, $R^{31}$, $R^{32}$, or $R^{33}$ in a compound of the general formula (I) include methyl group, ethyl group, and propyl group. Examples of the alkyl group having 2 to 20 carbon atoms represented by $R^{17}$ are ethyl group, propyl group, n-hexyl group, n-nonyl group, n-decyl group, n-dodecyl group, 2-ethylhexyl group, 1,3-dimethylbutyl group, 1-methylbutyl group, 1,5-dimethylhexyl group, and 1,1,3,3-tetramethylbutyl group. Examples of the cyclohexylalkyl group wherein the alkyl chain has 2 to 12 carbon atoms include cyclohexylethyl group, 3-cyclohexylpropyl group, and 8-cyclohexyloctyl group. Examples of the alkylcyclohexyl group wherein the alkyl chain has 1 to 4 carbon atoms include 2-ethylcyclohexyl group, 2-propylcyclohexyl group, and 2-(n-butyl)cyclohexyl group. Examples of the $C_{2-12}$ alkyl group substituted with an alkoxyl group having 2 to 12 carbon atoms include 3-ethoxy-n-propyl group, propoxypropyl group. 4-propoxy-n-butyl group, 3-methyl-n-hexyloxyethyl group, and 3-(2-ethylhexyloxy)propyl group. Examples of the phenyl group substituted with an alkyl group having 1 to 20 carbon atoms include o-isopropylphenyl group. Examples of the $C_{1-20}$ alkyl group substituted with phenyl group include DL-1-phenylethyl group, benzyl group, and 3-phenyl-n-butyl group. Examples of the alkyl group having 2 to 12 carbon atoms and represented by $R^{10}$ or $R^{190}$ include ethyl group, propyl group, n-hexyl group, n-nonyl group, n-decyl group, n-dodecyl group, 2-ethylhexyl group, 1,3-dimethylbutyl group, 1-methylbutyl group, 1,5-dimethylhexyl group, and 1,1,3,3-tetramethylbutyl group. Examples of the alkylene group having 2 to 12 carbon atoms and represented by $R^{181}$ or $R^{191}$ include dimethylene group and hexamethylene group.

The dye (I) may be a compound represented by the general formula (I) or its salt. Examples of the salt include those with alkaline metals such as sodium and potassium or with amines such as triethylamine and 1-amino-3-phenylbutane. When the group $R^{14}$, $R^{15}$ or $R^{16}$ is a sulfonic acid group, the salt is one that is formed at the position of the sulfonic acid group.

Examples of the dye (I) include C.I. Acid Red 289. These are used singly or in combination.

Examples of the dye (II) include compounds represented by the general formula (II):

(II)

wherein $R^{21}$ and $R^{22}$ each represents hydroxyl group or a carboxylic acid group; $R^{20}$ $R^{23}$ $R^{24}$, and $R^{25}$ each independently represents hydrogen atom, a halogen atom, an alkyl group having 1 to 4 carbon atoms, a sulfonic acid group, an alkyl group having 1 to 4 carbon atoms, or nitro group, and salts thereof.

As the halogen atom represented by $R^{20}$, $R^{23}$, $R^{24}$, or $R^{25}$ in the general formula (II), there are mentioned fluorine atom, chlorine atom, bromine atom, and others. Examples of the alkyl group having 1 to 4 carbon atoms include methyl group, ethyl group, propyl group, and butyl group. Examples of the alkoxyl group having 1 to 4 carbon atoms include methoxy group, ethoxy group, propoxy group, and butoxy group.

The dye (II) may be a compound of the general formula (II) or a salt thereof. Examples of the salt include those with alkaline metals such as sodium and potassium or with amines such as triethylamine, 2-ethylhexylamine, and 1-amino-3-phenylbutane. When the group $R^{23}$, $R^{24}$, $R^{25}$, or $R^{26}$ is a sulfonic acid group, usually, the salt is one that is formed at the position of the sulfonic acid group.

The dye (II) may form a complex through coordination with a chromium atom. By forming the complex with a chromium atom, the light fastness is further improved.

Examples of the dye (II) include C.I. Acid Yellow 17, C.I. Solvent Orange 56, and C.I. Solvent Yellow 82. They are used either singly or in combination.

The amount of the dye (I) and that of the dye (II) contained in the red filter layer of the color filter array of the present invention are controlled so that the transmittance of the red filter layer is 1% or less at a wavelength of 535 nm and 90% or more at 650 nm. To be more concrete, usually, the content of the dye (I) and that of the dye (II) are, per a total of 100 parts by weight of the dye (I) and the dye (II), about 20 to 60 parts by weight and 80 to 40 parts by weight, respectively. A dye (I) content of less than 20 parts by weight tends to lead to an insufficient light fastness or unsatisfactory spectroscopic characteristics with respect to red light.

If it exceeds 60 parts by weight, its spectroscopic characteristics with respect to red light tend to be unsatisfactory. A dye (II) content of less than 40 parts by weight may lead to an insufficient light fastness or unsatisfactory spectroscopic characteristics with respect to red light. If it exceeds 80 parts by weight, the amount of i-ray absorption is raised, which tends to make the formation of a pattern through exposure to light difficult.

The red filter layer of the color filter array of the present invention may contain other dyes for controlling the color, in other words, its spectroscopic characteristics. For example, it may contain a pyridone azo dye having its absorption maximum at a wavelength within the range of from 400 to 500 nm (hereinafter, referred to as "dye (III)").

(III)

wherein $R^{30}$ represents an alkyl group having 2 to 10 carbon atoms; $R^{31}$, $R^{32}$, and $R^{34}$ each independently represents hydrogen atom, methyl group, hydroxyl group, or cyano group; and $R^{33}$ represents an alkyl group having 1 to 4 carbon atoms. By incorporating the dye (III), the spectroscopic characteristics of red filter layer is improved more. As the result, a color filter array having a red filter layer which has a transmittance at a wavelength of 450 nm of 5% or less, that at 535 nm of 1% or less and that at 650 nm of 90% or more, and more preferable one which has a transmittance at a wavelength of 450 nm of 3% or less, that at 535 nm of 1% or less and that at 650 nm of 90% or more, can be obtained.

In a compound represented by the general formula (III), examples of the alkyl group having 2 to 10 carbon atoms and represented by $R^{30}$ include ethyl group, propyl group, n-hexyl group, n-nonyl group, n-decyl group, n-dodecyl group, 2-ethylhexyl group, 1,3-dimethylbutyl group, 1-methylbutyl group, 1,5-dimethylhexyl group, and 1,1,3,3-tetramethylbutyl group. Examples of the alkyl group having 1 to 4 carbon atoms and represented by $R^{33}$ include methyl group, ethyl group, propyl group, and butyl group.

Examples of the dye (III) include C.I. Solvent Yellow 162. These are used singly or in combination.

When the dye (III) is used, its content is usually 10-40 parts by weight per a total of 100 parts by weight of the dye (I) and the dye (II). If the content of the dye (III) is less than 10 parts by weight or more than 40 parts by weight or more, the improvement of the spectroscopic characteristics tends to be unsatisfactory with respect to red light.

The color filter array of the present invention can be produced by an ordinary color resist method. For example, it can be produced by a process comprising the step of patterning a photosensitive resin composition comprising colorants. The photosensitive resin composition comprises the dye (I) and the dye (II). The amounts of the dye (I) and the dye (II) comprised in the photosensitive resin composition are individually the same as those in the desired red filter layer. The transmittance of the red filter layer after the patterning is 1% or less at 535 nm and 90% or more at 650 nm.

If the red filter layer is desired to comprise the dye (III), a photosensitive resin composition comprising the dye (III) is employed. The amounts of the dye (III) comprised in the photosensitive resin composition are the same as those in the desired red filter layer.

The photosensitive resin composition may be a positive photosensitive resin composition or a negative photosensitive resin composition.

The positive photosensitive resin composition of the present invention comprises, for example, a photoactive compound and an alkali-soluble resin in addition to the above-described dyes.

A photoactive compound used in conventional photosensitive resin compositions can be used in the positive photosensitive resin composition of the present invention.

Examples thereof include esters of phenolic compounds with o-naphthoquinonediazide sulfonates. Examples of the phenolic compounds include compounds represented by the chemical formula (10).

(10)

As the o-naphthoquinonediazide sulfonates, o-naphthoquinonediazide-5-sulfonate and o-naphthoquinonediazide-4-sulfonate can be exemplified.

The term "alkali-soluble resin" refers to resins that dissolve in alkaline developers, and any—alkali-soluble resin similar to those used in conventional photosensitive resin compositions can be employed. Examples of such alkali-soluble resins include novolak resins such as those of p-cresol novolak resins, novolak resins of p-cresol and m-cresol; novolak resins having the structure represented by the formula (20):

(20)

; polyvinylphenol; and copolymers of styrene with vinylphenol. Preferably, a novolak resin is employed as the alkali-soluble resin.

The amounts of the dyes, the photoactive compound, and the alkali-soluble resin comprised in the photosensitive resin composition are usually 25 to 55 parts by weight, 25 to 55 parts by weight, and 3 to 50 parts by weight, per a total of 100 parts by weight of the dyes, photoactive compound, and alkali-soluble resin, respectively.

Into the positive photosensitive resin composition, a curing agent may be incorporated. Incorporation of the curing agent improves the mechanical strength of the pattern formed by using the photosensitive resin composition.

As the curing agent, usually, a heat curing agent which is cured through heating is employed. Examples of the heat curing agent include compounds represented by the general formula (30):

(30)

wherein $Q^1$, $Q^2$, $Q^3$, and $Q^4$ each independently represents hydrogen atom, a hydroxyalkyl group having 1 to 4 carbon atoms, or an alkyl group having 1 to 4 carbon atoms and substituted with an alkoxyl group having 1 to 4 carbon atoms; Z represents phenyl group or a group represented by the general formula (31):

$$Q^5Q^6N— \qquad (31)$$

wherein $Q^5$ and $Q^6$ each independently represents hydrogen atom, a hydroxyalkyl group having 1 to 4 carbon atoms, or an alkyl group having 1 to 4 carbon atoms and substituted with an alkoxyl group having 1 to 4 carbon atoms with the proviso that at least one of $Q^1$ to $Q^6$ is a hydroxyalkyl group having 1 to 4 carbon atoms or an alkyl group having 1 to 4 carbon atoms and substituted with an alkoxyl group having 1 to 4 carbon atoms.

Examples of the hydroxyalkyl group having 1 to 4 carbon atoms include hydoxymethyl group, hydroxyethyl group, hydroxypropyl group, and hydroxybutyl group. Examples of the alkyl group having 1 to 4 carbon atoms and substituted with an alkoxyl group having 1 to 4 carbon atoms include methoxymethyl group, methoxyethyl group, ethoxyethyl group, and propoxybutyl group.

An example of the compound represented by the general formula (30) is hexamethoxymethylmelamine.

Moreover, compounds of the following chemical formulae (32) to (37) can be used as the curing agent in the positive photosensitive resin composition of the present invention, for example.

(32)

(33)

(34)

(35)

(36)

(37)

When the curing agent is used, its content is usually not less than 10 parts by weight and not more than 35 parts by weight per a total of 100 parts by weight of the dyes, the photoactive compound, and the alkali-soluble resin.

The positive photosensitive resin composition of the present invention is usually diluted with a solvent.

The solvent is suitably selected according to the solubilities of the dye (I), dye (II), dye (III), dye (IV) photoactive compound, alkali-soluble resin, and curing agent, especially according to the solubilities of the dye (I), dye (II), dye (III), and dye (IV). For example, methyl cellosolve, ethyl cellosolve, methyl cellosolve acetate, ethyl cellosolve acetate, diethylene glycoldimethyl ether, ethylene glycol monoisopropyl ether, propylene glycol monomethyl ether, N-methylpyrrolidone, γ-butyrolactone, dimethyl sulfoxide, N,N'-dimethylformamide, cyclohexane, ethyl acetate, n-butyl acetate, propylene glycol monoethyl ether acetate, ethyl acetate, ethyl pyruvate, ethyl lactate, or the like can be employed. These solvents are used either singly or in combination.

The amount of the solvent to be used is usually about 180 to 400 parts by weight per a total of 100 parts by weight of the dyes, photoactive compound, alkali-soluble resin, and curing agent.

The negative photosensitive resin composition of the present invention comprises, for example, a photoreactive acid generator, a curing agent, and an alkali-soluble resin, in addition to the dyes described above.

A photoreactive acid generator use in conventional negative photoreactive resin compositions can be employed as the photoreactive acid generator used in the negative photosensitive resin composition of the present invention. Examples thereof include compounds represented by the general formula (40):

(40)

wherein $Q^7$ represents an alkyl group having 1 to 3 carbon atoms, and $Q^8$ represents a phenyl group substituted with an alkyl group having 1 to 3 carbon atoms or a phenyl group substituted with an alkoxyl group having 1 to 3 carbon atoms.

Examples of the alkyl group having 1 to 3 carbon atoms represented by $Q^7$ include methyl group, ethyl group, and propyl group. An example of the phenyl group substituted with an alkyl group having 1 to 3 carbon atoms and represented by $Q^8$ is o-isopropylphenyl group. Examples of the phenyl group substituted with an alkoxyl group having 1 to 3 carbon atoms include p-methoxyphenyl group, p-ethoxylphenylgroup, and p-propoxyphenyl group.

Moreover, compounds represented by the chemical formulae (41) to (47):

(41)

(42)

(43)

(44)

(45)

(46)

(47)

can also be used as the photo acid generator, for example.

As the curing agent, a heat curing agent which is cured through heating is usually employed as in the case of conventional negative photosensitive resin composition. The heat curing agents listed above as examples for the positive photosensitive resin composition can also be employed in the negative photosensitive resin composition of the present invention.

The alkali-soluble resins listed above as examples for the positive photosensitive resin composition can also be employed in the negative photosensitive resin composition of the present invention, as in the case of conventional negative photosensitive resin composition.

The amounts of the photo acid generator, curing agent, and alkali-soluble resin comprised in the negative photosensitive resin composition per a total of 100 parts by weight of the dyes, photoreactive acid generator, curing agent, and alkali-soluble resin are as follow. The content of the dyes is usually about 15 to 40 parts by weight, and that of the photo acid generator is usually 0.3 to 5 parts by weight. The amount of the curing agent to be used is usually 10 to 25 parts by weight, and the content of the alkali-soluble resin is usually 20 to 75 parts by weight.

The negative photosensitive resin composition is usually diluted with a solvent.

The solvent is selected according to the solubilities of the dye (I), dye (II), dye (III), photo acid generator, alkali-soluble resin, and curing agent, especially according to the solubilities of the dye (I), dye (II), and dye (III). The solvent listed above as examples for the positive photosensitive resin composition can be employed. The amount of the solvent to be used is usually about 180 to 400 parts by weight per a total of 100 parts by weight of the dyes, photo acid generator, curing agent, and alkali-soluble resin.

Since the above-described photosensitive resin composition employs the dye (I) and the dye (II) as its colorants, almost no precipitate is generated even if the composition is stored for a long period of time. Consequently, the composition can be applied onto the substrate practically without irregularities. This makes it possible to provide a color filter array having a red filter layer with a pattern of about 0.5 to 2 m in thickness and about 2 to 20 µm in length of each side.

The patterning is effected, for example, by providing a coat of the above-described resin composition on a substrate, exposing the coat to light, and then developing.

The coat is provided on the substrate by applying a diluted photosensitive resin composition thereto. The composition is usually applied by spin coating. After the composition has been applied onto the substrate, the coat is heated up to, for example, about 80 to 130° C. to evaporate the solvent comprised therein. Thus, a coat of the photosensitive resin composition is obtained.

Thereafter, the coat is exposed to light. The exposure to light involves the use of a mask pattern corresponding to the desired pattern, and is effected by irradiating the coat with a beam through the mask pattern. As the beam for the exposure of the coat to light, for example, g-ray, i-ray, or the like can be employed. Such an exposure equipment as the g-ray stepper or i-ray stepper may be employed for the exposure. When a negative photosensitive resin composition is used, the coat is heated after the exposure to light. When the positive photosensitive resin composition is used, the coat may be heated after the exposure or may not be heated. On heating the coat, the heating temperature is, for example, about 80 to 150° C.

After having been exposed to light, the coat is subjected to development. The development is effected by immersing the substrate provided with the coat in a developer, as in the case of the use of an ordinary photosensitive resin composition. Developer used for patterning conducted by using a conventional photosensitive resin composition can also be employed in patterning in the present invention. A color filter array having a red filter layer defined in the desired pattern can be obtained by taking the substrate out of the developer and then washing with water to remove the developer.

When a positive photosensitive resin composition is used, after having been washed with water, the substrate may be subjected to ultraviolet ray irradiation. Irradiation of ultraviolet rays can decompose the remaining photoactive compound. Moreover, when the photosensitive resin composition comprises a heat curing agent, the substrate may be heated after having been washed with water. By heating, the mechanical strength of the formed red filter layer can be improved. The heating temperature is usually not lower than 160° C. and not higher than 220° C. Usually, the heating temperature is not higher than the decomposition temperatures of the dyes.

When a negative photosensitive resin composition is used, the substrate may be heated after having been washed with water. By heating, the mechanical strength of the formed red filter layer is improved. The heating temperature is usually not lower than 160° C. and not higher than 220° C. Usually, the heating temperature is not higher than the decomposition temperatures of the dyes.

Thus, a red filter layer in the desired pattern is formed. The other filter layers, that is, a green filter layer and a blue filter layer are formed in the same plane of the substrate which has been provided with the red filter layer, according, for example, to a conventional manner. When employing a positive photosensitive resin composition, it is preferred to employ one comprising a curing agent and carry out heating after development, for the strength of the formed red filter layer is improved. The red filter layer may be formed after the other color filter layers have been provided on the substrate.

Thus, a color filter array constituted of the red filter layer, green filter layer, and blue filter layer that are formed so as to be adjoining to each other in the same plane of the substrate can be obtained. The color filter array thus obtained is used for a solid-state image device, a liquid crystal display device, and the like. For instance, in the solid-state image device, if the color filter array is disposed on the front side of its charge-coupled device, color images excellent in color reproductivity, especially in the reproductivity of red color, can be obtained.

The color filter array of the present invention shows excellent spectroscopic characteristics with respect to red light and has a red filter layer excellent in light fastness. Moreover, since dyes are employed as its colorants, the photosensitive resin composition to be employed for its production generates a less amount of precipitates and is excellent in store stability. As a result, a red filter layer less in foreign matter content and uniform in thickness can be produced with ease. This color filter array is favorably employed for use in a liquid crystal display device or a solid-state image device comprising a charge-coupled device.

Hereinafter, the present invention will be described in more detail based on Examples, but these should by no means be construed as defining the scope of the present invention.

EXAMPLE 1

After 4 parts by weight of the compound represented by the formula (50);

(50)

as the dye (I), C.I. 3 parts by weight of Solvent Orange 56 as the dye (II), 2 parts by weight of C.I. Solvent Yellow 82 as the dye (II), 2 parts by weight of C.I. Solvent Yellow 162 as the dye (III), 10 parts by weight of the ester of a phenolic compound represented by the chemical formula (10) with o-naphthoquinonediazide-5-sulfonate, as the photoactive compound, 2 parts by weight of a novolak resin of p-cresol as the alkali-soluble resin (weight average molecular weight in terms of polystyrene: 6,000), 7 parts by weight of hexamethoxymethylmelamine as the curing agent, and 70 parts by weight of ethyl lactate as the solvent had been mixed and dissolved, the resulting mixture was filtrated with a membrane filter having a pore size of 0.1 μm to provide a positive photosensitive resin composition.

Figure 4:
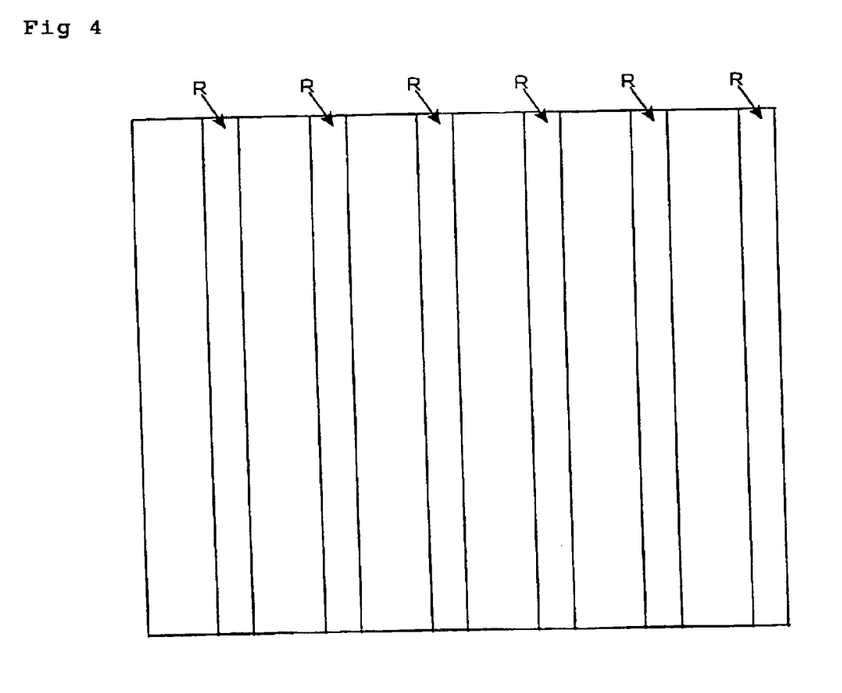
FIG. 4 is a plane schematic view of the color filter array obtained in Example 1.

A coat was formed by applying the positive photosensitive resin composition obtained above onto a substrate (silicon wafer) by spin coating and heating at 100° C. for 1 minute to evaporate ethyl lactate therefrom. The coat had been exposed to light by irradiation of i-ray through a mask pattern using an exposure equipment ("Nikon NSR17A" manufactured by Nikon Corp.). Then, the pattern was developed by immersing the coated substrate in a developer ("SOPD" manufactured by Sumitomo Chemical Co., Ltd.) at 23° C. for 1 minute. After the development, the substrate was washed with water, dried, irradiated with ultraviolet rays, and heated to 180° C. for 3 minutes to give a color filter array having a red filter layer in a striped-pattern (FIG. 4). The red red layer has a line width of 1.0 μm and a thickness of 1.5 μm.

Figure 5:
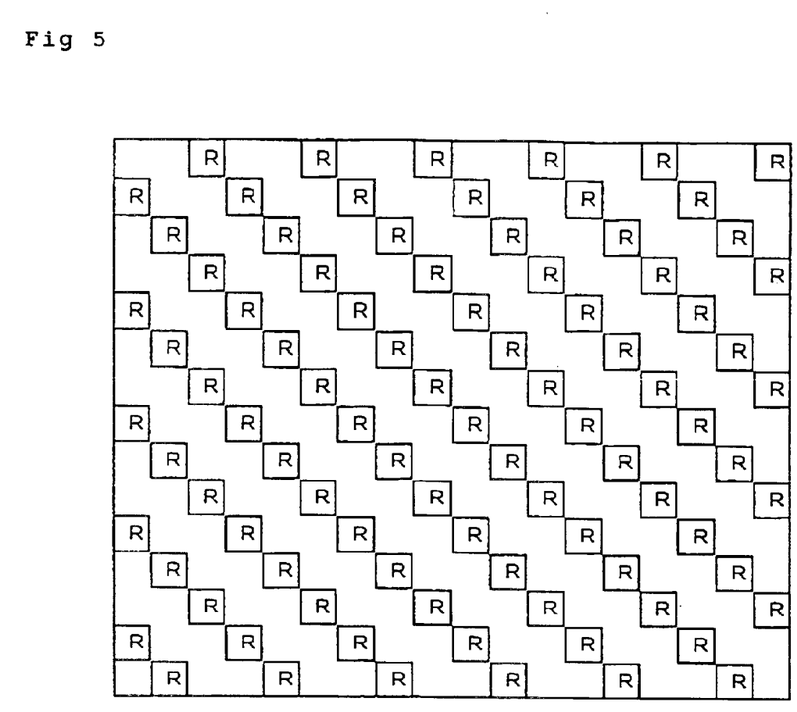
FIG. 5 is a plane schematic view of the color filter array obtained in Example 1.

Thereafter, except using a different mask pattern, the same procedure as above was repeated to give a color filter array having a red filter layer formed in a mosaic pattern (FIG. 5). The red filter layer has a line width of 2.0 μm and a thickness of 1.5 μm.

Except that a transparent glass plate was employed as the substrate in place of a silicon wafer and that the pattern was developed without being exposed to light, the same procedure as above was repeated to give a red filter layer formed in a thickness of 1.8 μm all over the substrate.

EXAMPLE 2

After 4 parts by weight of a compound represented by the chemical formula (50) as the dye (I), 3 parts by weight of C.I. Solvent Orange 56 as the dye (II), 2 parts by weight of C.I. Solvent Yellow 82 as the dye (II), 2 parts by weight of C.I. Solvent Yellow 162 as the dye (III), 0.5 parts by weight of a compound represented by the chemical formula (51)

as the photo acid generator, 14.5 parts by weight of a novolak resin of p-cresol as the alkali-soluble resin (weight average molecular weight in terms of polystyrene: 5,000), 4 parts by weight of hexamethoxymethylmelamine as the curing agent, and 70 parts by weight of ethyl lactate as the solvent had been mixed and dissolved. The resulting mixture was filtrated with a membrane filter having a pore size of 0.1 μm to provide a negative photosensitive resin composition.

A coat was formed by applying the negative photosensitive resin composition obtained above onto a substrate (silicon wafer) by spin coating and heating at 100° C. for 1 minute to evaporate ethyl lactate therefrom. The coat had been exposed to light by irradiation of i-ray through a mask pattern using an exposure equipment ("Nikon NSR i7A" manufactured by Nikon Corp.), followed by heated at 120° C. for 1 minute. Then, the pattern was developed by immersing the coated substrate in a developer ("SOPD" manufactured by Sumitomo Chemical Co., Ltd.) at 23° C. for 1 minute. After the development, the substrate was washed with water, dried, irradiated with ultraviolet rays and heated to 180° C. for 3 minutes to give a color filter array having a red filter layer in a striped-pattern. The red filter layer has a line width of 1.0 μm and a thickness of 1.5 μm.

Thereafter, except using a different mask pattern, the same procedure as in Example 1 was repeated to give a color filter array having a red filter layer formed in a mosaic pattern. The red filter layer has a line width of 2.0 μm and a thickness of 1.5 μm.

Except that a transparent glass plate was employed as the substrate in place of a silicon wafer and that the exposure to light was conducted without using the mask pattern, the same procedure as in Example 1 was repeated to give a red filter layer formed in a thickness of 1.5 μm all over the substrate.

EXAMPLE 3

A photosensitive resin composition for forming a green filter layer, a photosensitive resin composition for forming a red filter layer, and a photosensitive resin composition for forming a blue filter layer were prepared according to the respective blending formulations shown below.

| (Photosensitive resin composition for forming a red filter layer) | |
| --- | --- |
| Novolak resin | 5 parts by weight |
| o-naphthoquinonediazide-4-sulfonate | 8 parts by weight |
| Hexamethoxymethylmelamine | 2 parts by weight |
| Ethyl lactate | 50 parts by weight |
| N,N'-dimethylformamide | 25 parts by weight |
| A compound represented by the chemical formula (50) | 2 parts by weight |
| C.I. Solvent Orange 56 | 2 parts by weight |
| C.I. Solvent Yellow 82 | 2 parts by weight |
| C.I. Solvent Yellow 162 | 2 parts by weight |

| (Photosensitive resin composition for forming a blue filter layer) | |
| --- | --- |
| Novolak resin | 5 parts by weight |
| o-naphthoquinonediazide-4-sulfonate ester | 8 parts by weight |
| Hexamethoxymethylmelamine | 2 parts by weight |
| Ethyl lactate | 50 parts by weight |
| N,N'-dimethylformamide | 25 parts by weight |
| A compound represented by the chemical formula (52) | 3 parts by weight |
| C.I. Solvent Blue 25 | 3 parts by weight |
| C.I. Solvent Blue 90 | 2 parts by weight |

| (Photosensitive resin composition for forming a green filter layer) | |
| --- | --- |
| Novolak resin | 5 parts by weight |
| o-naphthoquinonediazide-4-sulfonate ester | 8 parts by weight |
| Hexamethoxymethylmelamine | 2 parts by weight |
| Ethyl lactate | 50 parts by weight |
| N,N'-dimethylformamide | 25 parts by weight |
| C.I. Solvent Blue 25 | 4 parts by weight |
| C.I. Solvent Yellow 82 | 2 parts by weight |
| C.I. Solvent Yellow 162 | 2 parts by weight |

Figure 6:
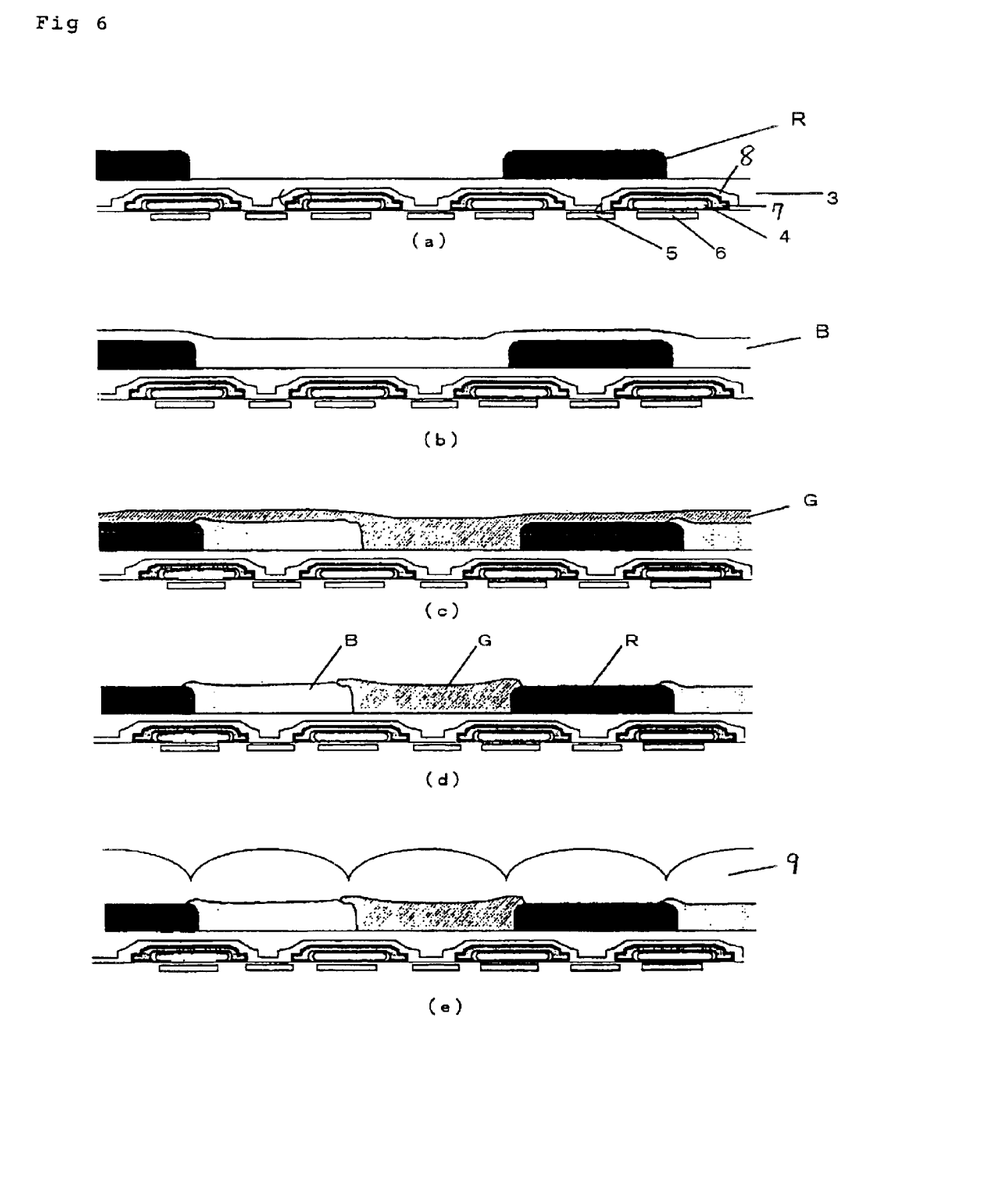
FIG. 6 is a schematic view illustrating the steps in Example 4.

The photosensitive resin composition for forming a red filter layer prepared above had been applied onto a silicon wafer provided with a charge-coupled device constituted of a over coating film (3), a polysilicon electrode (4), a sensor (5), a V resistor (6), a light-shielding film (7), and a passivation film (8) by spin coating. Then, its solvent was evaporated off on a baking plate at 100° C. Thereafter, using an i-ray stepper exposure equipment ("Nikon NSR2205 i12D" manufactured by Nikon Corp.), the substrate was irradiated with an ultraviolet ray of a wavelength of 365 nm through a reticle (0.2,000 mJ/cm²). Then, the substrate was subjected to development by a developing agent (an aqueous solution containing 30 g of tetramethylammonium hydroxide per 1,000 cm³). After the exposed portion had been removed, the substrate was washed with pure water. Thereafter, using a low-pressure mercury lamp (3,000 mJ/cm²), ultraviolet rays were irradiated all over the substrate, and the substrate was then heated on a baking plate at 180° C. for 10 minutes to form a red filter layer (FIG. 6(a)).

Except for using the photosensitive resin composition for forming a blue filter layer prepared above instead of the photosensitive resin composition for forming a red filter layer, the same procedure as above was repeated to form a blue filter layer (FIG. 6(b)).

Except for using the photosensitive resin composition for forming a green filter layer prepared above, the same procedure as above was repeated to form a green filter layer and consequently a color filter array (FIG. 6(c), (d)).

A microlens was formed on the color filter array in a conventional manner to give a solid-state image device. The thickness of the red filter layer of the color filter array at the solid-state image device was 1.7 μm. The color filter array at this solid-state image device showed good spectroscopic characteristics (FIG. 6(e)).

In the same manner as that described above, a red filter layer (thickness: 1.7 μm) was formed all over a quartz wafer.

COMPARATIVE EXAMPLE 1

Except that 4 parts by weight of a compound represented by the chemical formula (52):

(52)

in place of the compound represented by the chemical formula (50), the same procedure as in Example 1 was repeated to give a color filter array having a striped-pattern red filter layer with a line width of 1.0 μm and a thickness of 1.5 μm, a color filter array having a mosaic-pattern red filter layer with a line width of 2.0 μm and a thickness of 1.5 μm, and a red filter layer formed in a thickness of 1.5 μm all over the substrate.

Evaluation (1) Spectroscopic Characteristics

The color filter arrays each provided with a red filter layer all over its substrate and obtained in Examples and Comparative Example were subjected to measurement of light transmittance at 450 nm, 535 nm, and 650 nm. The results are shown in Table 1.

(2) Light Fastness

An ultraviolet ray-blocking filter ("colored optical glass L38" manufactured by Hoya Corp. Capable of blocking light of a wavelength of 380 nm or shorter) was disposed in front of each of the color filter arrays obtained in Examples and Comparative Example and provided with a red filter layer all over its substrate, followed by irradiating light at 1.000,000 lx·hour. "Sun tester XF 180 CPS" manufactured by Shimadzu Corp. was employed as the light source. The light transmittance of each color filter array after the irradiation was measured at a wavelength of 450 nm. 535 nm, and 650 nm. The results are shown in Table 2.

TABLE 1

| Wavelength | Light transmittance (%) | | |
| --- | --- | --- | --- |
| (nm) | 450 | 535 | 650 |
| Example 1 | 1.2 | 0.5 | 92 |
| Example 2 | 1.5 | 0.8 | 95 |
| Example 3 | 1.3 | 1.0 | 95 |
| Comparative example 1 | 1.0 | 3.0 | 95 |

TABLE 2

| Wavelength (nm) | Light transmittance (%) | | |
|---|---|---|---|
| | 450 | 535 | 650 |
| Example 1 | 2.7 | 1.0 | 94 |
| Example 2 | 2.8 | 1.2 | 96 |
| Example 3 | 2.8 | 1.4 | 95 |
| Comparative example 1 | 3.0 | 15.0 | 97 |

What is claimed is:

1. A color filter array having a red filter layer on a substrate
wherein the red filter layer comprises
a xanthene dye having its absorption maximum at a wavelength of 500 to 600 nm, and
a pirazolone azo dye having its absorption maximum at a wavelength of 400 to 550 nm; and
has a transmittance at a wavelength of 535 nm of 1% or less and that at 650 nm of 90% or more.

2. The color filter array having a red filter layer on a substrate according to claim 1,
wherein the red filter layer further comprises a pyridone azo dye having its absorption maximum at a wavelength of 400 to 500 nm, and has a transmittance of 5% or less at 450 nm.

3. A process for producing a color filter array having a red filter layer on a substrate which comprises the step of patterning a photosensitive resin composition comprising
a xanthene dye having its absorption maximum at a wavelength of 500 to 600 nm, and
a pirazolone azo dye having its absorption maximum at a wavelength of 400 to 550 nm; and
to form the red filter layer having a transmittance at a at a wavelength of 535 nm of 1% or less and that at 650 nm of 90% or more.

* * * * *